(12) United States Patent
Capati et al.

(10) Patent No.: US 10,938,003 B2
(45) Date of Patent: Mar. 2, 2021

(54) BATTERY PACKS TO POWER ELECTRIC VEHICLES

(71) Applicant: SF Motors, Inc., Santa Clara, CA (US)

(72) Inventors: Nathalie Capati, Santa Clara, CA (US); Duanyang Wang, Santa Clara, CA (US); Jacob Heth, Santa Clara, CA (US); Binbin Chi, Santa Clara, CA (US)

(73) Assignees: CHONGQING JINKANG NEW ENERGY VEHICLE CO., LTD., Chongqing (CN); SF Motors Inc., Santa Clara, CA (US)

( * ) Notice: Subject to any disclaimer, the term of this patent is extended or adjusted under 35 U.S.C. 154(b) by 170 days.

(21) Appl. No.: 16/118,285

(22) Filed: Aug. 30, 2018

(65) Prior Publication Data

US 2019/0081294 A1 Mar. 14, 2019

Related U.S. Application Data

(60) Provisional application No. 62/557,674, filed on Sep. 12, 2017.

(51) Int. Cl.
| | |
|---|---|
| *H01M 8/04* | (2016.01) |
| *H01M 2/10* | (2006.01) |
| *B60L 50/64* | (2019.01) |
| *H01M 2/20* | (2006.01) |

(52) U.S. Cl.
CPC ........... *H01M 2/1077* (2013.01); *B60L 50/64* (2019.02); *H01M 2/206* (2013.01); *H01M 2220/20* (2013.01)

(58) Field of Classification Search
CPC ....................................................... H01M 8/04
See application file for complete search history.

(56) References Cited

U.S. PATENT DOCUMENTS

2016/0172642 A1* 6/2016 Hughes ................. H01M 50/24
429/90

* cited by examiner

*Primary Examiner* — Jacob B Marks
(74) *Attorney, Agent, or Firm* — Foley & Lardner LLP; James De Vellis

(57) ABSTRACT

Systems and methods to power electric vehicles are disclosed. A battery pack to power an electric vehicle is provided. The battery pack residing in the electric vehicle. The battery pack can include a plurality of battery modules. Each of the plurality of battery modules can include a plurality of battery blocks. A first battery block can include a plurality of cylindrical battery cells. Each of the plurality of cylindrical battery cells can have a pair of battery cell terminals and can have a voltage of up to 5 volts across the pair of battery cell terminals. The plurality of cylindrical battery cells can be electrically connected in parallel within the first battery block. Each cylindrical battery cell of the plurality of cylindrical battery cells can be spatially separated from each of at least one adjacent cylindrical battery cell within the first battery block by less than 2 millimeter (mm).

20 Claims, 7 Drawing Sheets

BATTERY PACKS TO POWER ELECTRIC VEHICLES

RELATED APPLICATION

The present application claims the benefit of, and priority under 35 U.S.C. § 119(e) to U.S. Provisional Application 62/557,674, titled "BATTERY BLOCKS", filed on Sep. 12, 2017, the entire disclosure of which is incorporated herein by reference in its entirety.

BACKGROUND

Vehicles such as automobiles can include power sources. The power sources can power motors or other systems of the vehicles.

SUMMARY

In at least one aspect, a system to power electric vehicles is provided. The system includes a battery pack to power an electric vehicle. The battery pack residing in the electric vehicle. The battery pack can include a plurality of battery modules. Each of the plurality of battery modules can include a plurality of battery blocks. A first battery block of the plurality of battery blocks can have a pair of battery block terminals. The first battery block can include a plurality of cylindrical battery cells. Each of the plurality of cylindrical battery cells of the first battery block can have a pair of battery cell terminals. Each of the plurality of cylindrical battery cells of the first battery block can have a voltage of up to 5 volts across each respective pair of battery cell terminals. The plurality of cylindrical battery cells can be electrically connected in parallel within the first battery block. Each cylindrical battery cell of the plurality of cylindrical battery cells can be spatially separated from each of at least one adjacent cylindrical battery cell within the first battery block by less than 2 millimeter (mm). The plurality of cylindrical battery cells can provide a battery block capacity to store energy that is at least five times greater than a battery cell capacity of each of the plurality of cylindrical battery cells. The first battery block can have a voltage of up to 5 volts across the pair of battery block terminals of the first battery block. Each of the plurality of battery modules can have a battery module capacity that is greater than the battery block capacity. Each of the plurality of battery modules can have a battery module voltage greater than the voltage across the pair of battery block terminals of the first battery block.

In at least one aspect, a method of providing an electric vehicle with a battery pack is provided. The method includes arranging a plurality of cylindrical battery cells within a battery block. Each of the plurality of cylindrical battery cells can have a pair of battery cell terminals and the battery block can have a pair of battery block terminals. The method can include spatially separating each cylindrical battery cell of the plurality of cylindrical battery cells from each of at least one adjacent cylindrical battery cell by a distance less than 1.2 millimeters (mm) or less within the battery blocks. Each of the plurality of cylindrical battery cells can have a voltage of up to 5 volts across each respective pair of battery cell terminals. The method can include electrically connecting the plurality of cylindrical battery cells in parallel with one another to provide a battery block capacity for storing energy that is at least five times greater than a battery cell capacity of each of the plurality of cylindrical battery cells, and having a voltage of up to 5 volts across the pair of battery block terminals of the battery block. The method can include disposing a plurality of the battery blocks within each of a plurality of battery modules. Each of the plurality of battery modules can have a battery module capacity that is greater than the battery block capacity. Each of the plurality of the battery modules can have a battery module voltage that is greater than the voltage across the pair of battery block terminals of the battery block. The method can include forming a battery pack using the plurality of the battery modules, to reside in an electric vehicle and to power the electric vehicle.

In at least one aspect, a method of providing a battery pack for an electric vehicle is provided. The method includes providing a battery pack to power an electric vehicle. The battery pack can reside in the electric vehicle. The battery pack can include a plurality of battery modules. Each of the plurality of battery modules can include a plurality of battery blocks. A first battery block of the plurality of battery blocks can include a pair of battery block terminals. The first battery block can include a plurality of cylindrical battery cells. Each of the plurality of cylindrical battery cells of the first battery block can include a pair of battery cell terminals. Each of the plurality of cylindrical battery cells of the first battery block can include a voltage of up to 5 volts across each respective pair of battery cell terminals. The plurality of cylindrical battery cells can be electrically connected in parallel within the first battery block. Each cylindrical battery cell of the plurality of cylindrical battery cells can be spatially separated from each of at least one adjacent cylindrical battery cell within the first battery block by less than 2 millimeter (mm). The plurality of cylindrical battery cells can provide a battery block capacity to store energy that is at least five times greater than a battery cell capacity of each of the plurality of cylindrical battery cells. The first battery block can have a voltage of up to 5 volts across the pair of battery block terminals of the first battery block. Each of the plurality of battery modules can have a battery module capacity that is greater than the battery block capacity. Each of the plurality of battery modules can have a battery module voltage greater than the voltage across the battery block terminals of the first battery block.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not necessarily intended to be drawn to scale. Like reference numbers and designations in the various drawings indicate like elements. For purposes of clarity, not every component may be labelled in every drawing. In the drawings.

DETAILED DESCRIPTION

Figure 1:
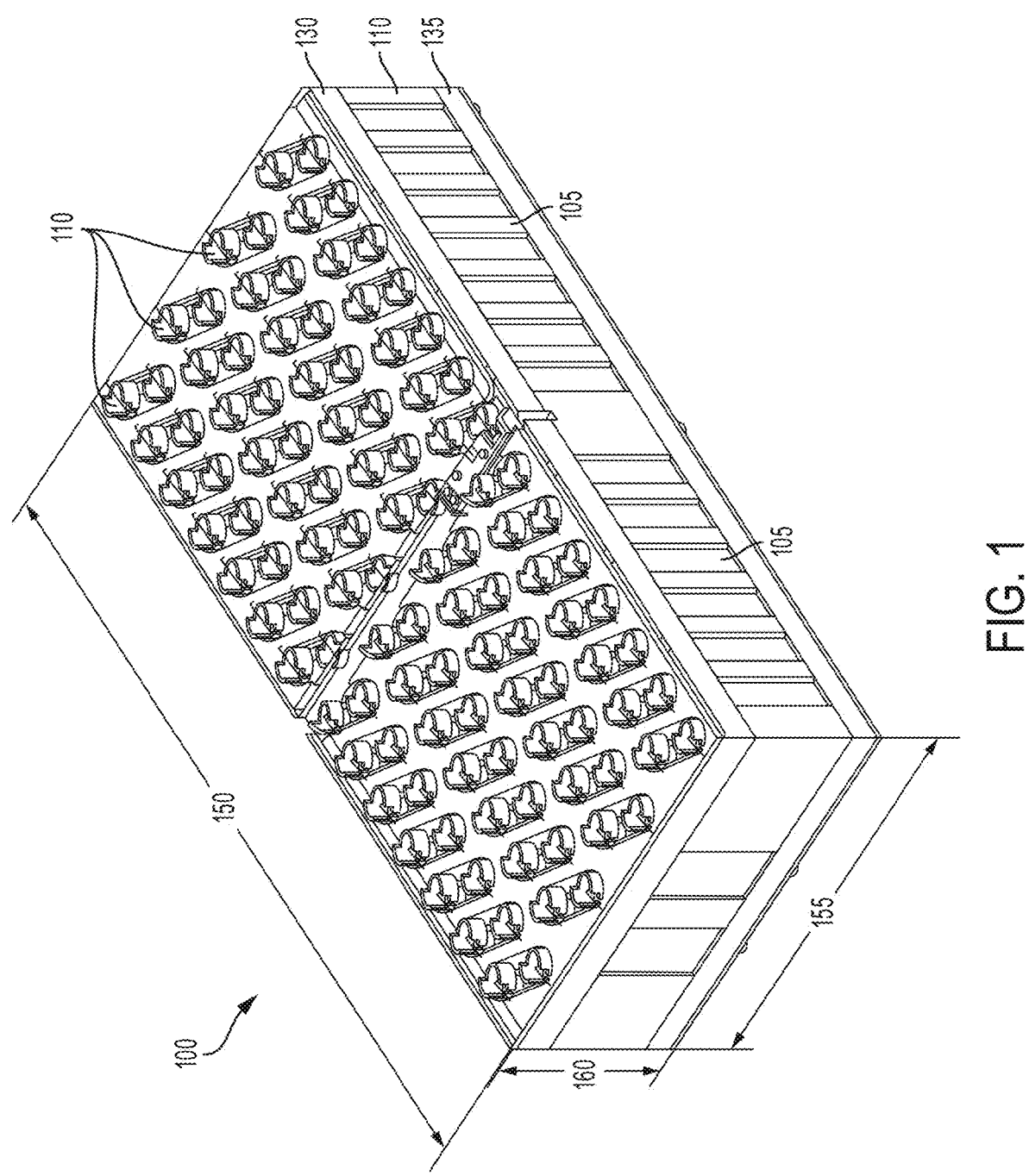
FIG. 1 depicts an isometric view of an example system for providing energy storage.

Following below are more detailed descriptions of various concepts related to, and implementations of, methods, apparatuses, devices, and systems for providing battery packs to power electric vehicles. The various concepts introduced above and discussed in greater detail below may be implemented in any of numerous ways.

With reference to the FIGS., the systems, methods, devices, and apparatuses of the present disclosure relate generally to battery related energy storage devices, including but not limited to battery blocks and battery packs. There is an increasing demand for higher capacity battery cells for higher power, higher voltage battery packs, to support applications in plug-in hybrid electrical vehicles (PHEVs), hybrid electrical vehicles (HEVs), electrical vehicle (EV) systems, or stationary energy storage, for example. Challenges with increasing the capacity at the battery cell level include packaging efficiency and safety.

For example, there is an increasing demand for higher capacity battery cells 110 (e.g., 0-5V and 2-20 Ah) for high power, higher performance battery modules 100 or battery packs 405. Such battery modules 100 or battery packs 405 can be used to support applications such as plug-in hybrid electrical vehicle (PHEV), hybrid electrical vehicle (HEV), electrical vehicle (EV), automotive system, stationary storage. The challenges with increasing energy storage capacity at the battery cell level include packaging efficiency and safety. For example, increasing capacity at the battery cell level can cause the cell to be more reactive and overheat. In the case of overheating, runaway vent gasses generated within a battery cell 110 should be allowed to exit the cell at a suitably fast rate or the cell can breakdown. High capacity battery cells 110 may have individual capacity of at least 50 Ah for instance, and may have only 1-2 small vents which may not be adequate for high energy release, and may result in high pressure vent gas release, high temperature fire, arcing or explosion. Further, increasing the capacity at the battery cell level may entail a physically larger and heavier cell format that can negatively impact energy density or performance.

The systems and methods are provided herein for a battery pack to power electric vehicles. The battery pack includes one or more battery modules, and the battery modules include one or more battery blocks. Each of the battery packs include one or more battery cells and each of the plurality of battery cells can have a voltage of up to 5 volts (or other limit) across terminals of the corresponding cell. The battery block can include an arrangement of the plurality of battery cells electrically connected in parallel. Each cell of the plurality of battery cells can be spatially separated from each of at least one adjacent cell by, for example, two millimeter (mm) or less. The arrangement of the plurality of battery cells can provide a modular unit for storing energy and can have a voltage of up to 5 volts across terminals of the battery block. The modular unit can be electrical connected to one or more other modular units to form a battery module or battery pack of a specified capacity.

With reference to the FIGS., a battery module 100 or battery pack 405 can be designed and implemented to meet power and energy requirements set forth for a particular application. Power and energy is a function of voltage, current, and capacity, which can be defined by a certain series and parallel configuration ("s" and "p" count). The number of battery cells 110 in series multiplied by the number of battery cells 110 in parallel can equal the number of battery cells 110 for meeting the voltage, current, and capacity targets, and can thus be a fixed number. These battery cells 110 can be contained and protected within a single enclosure (e.g., a battery module 100, a battery pack 405) and can thus define the minimum volume for the battery enclosure.

One problem in designing battery modules 100 or battery packs 405 is as follows. The number of battery cells 110 in the battery module 100 or the battery pack 405 can be dependent on the available space to house the batteries cells 110 which can be unknown during the ideation phase and can likely change as the design of the product changes. If the available space increases or decreases, the voltage, current, or capacity of the battery module 100 or battery pack 405 can increase or decrease, which can significantly impact the overall system performance. Due to the typically long development cycle of a battery module 100 or battery pack 405, development can start as early as ideation and specify power and energy requirements before the product design is fixed, which can ultimately result in an unwanted trade-off between performance and design.

One option can be to design a new unique battery module 100 or battery pack 405 for each new product, to ensure both performance and design targets are met. A problem with this strategy is that each unique new battery modules 100 or battery packs 405 can add additional time to market and costs for development, certification or manufacturing, which is an issue for most companies developing large battery modules 100 or battery packs 405. A favorable approach can adopt a modular pack design by designing battery modules 100 that could be shared among different battery packs 405. A potential issue with this approach is that it may not work with a company that has a highly diverse product portfolio spanning different industries. This is because battery modules 100 are the largest component or unit in a battery pack 405, and each new product that shares this battery module 100 would have similar dimensional constraints and performance targets.

The systems and methods described herein offer a solution for flexibly supporting various battery module 100 or battery pack 405 designs, by standardizing or optimizing on the second smallest component in the battery pack 405, a "block 105" (sometimes referred to herein as battery block 105) that is a subcomponent of a battery module 100. A battery block 105 can be coupled or configured in series or in parallel to meet varying power and energy requirements. For example, two battery blocks 105 each with 5V across each of their terminals, can be connected electrically in series to form a unit that has a voltage of up to 10V across the terminals of the unit. A battery block 105 can have a fixed design and can be 4-20 times smaller than a battery module 100 (e.g., minimum volume is less than 0.05 cubic feet), which can be easier to arrange for packaging into different products of various sizes.

Battery cell suppliers can offer cells in different packaging formats: cylindrical, prismatic can, or polymer "pouch" formats. Cylindrical cells can be used in low voltage applications, small format devices (e.g., power tools). Cylindrical cells are usually not used or found in larger systems (e.g., for automotive, energy storage). Modules may not use cylindrical cells due to their small form factor and level of difficulty for design and packaging in larger systems and therefore do not contain blocks of such cells 110. The battery block design described herein include cylindrical battery cells 110 packaged into a prismatic format for increased utility in larger battery modules. For example, each of the cylindrical battery cells 110 can have the same shape and dimensions. The cylindrical battery cells 110 can be arranged within a battery block 105 in a predetermined order such that the individual cylindrical battery cells 110 can be individually replaced or additional cylindrical battery cells 110 can be added to increase the capacity of the respective battery block 105. The battery blocks 105 can have the same shape and dimensions and can be combined with one or more different battery blocks 105 to form a battery module 100 or a battery pack.

For example, the battery block design described herein can increase yield rate and improve system reliability. If one battery cell 110 were to fail in a battery block 105, it does not compromise the entire block 105. Certain battery cells 110 can also be replaced in a battery block 105 to make up for any lost capacity. For example, a monolithic battery cell 110 may be rendered inoperable if any portion of the battery cell 110 is to fail. For example, if a 50 Ampere-hour (Ah) battery block 105 containing ten (10) 5 Ah battery cells 110 has an individual battery cell 110 that has failed, the battery block 105 then becomes 45 Ah, and the battery pack system 405 would only see a loss of 5 Ah. The cylindrical battery cells 110 can provide a battery block capacity to store energy that is at least five times greater than a battery cell capacity of each of the plurality of cylindrical battery cells 110, and the battery blocks 105 can have a voltage of up to 5 volts across the pair of battery block terminals of the respective battery blocks 105.

The battery block design described herein can include a cell holder 130, 135 (or multiple cell holders 130, 135) that maintains the relative positions of its component battery cells 110 spatially separated from each other. The cell holders 130, 135 can provide structural support for maintaining or holding the battery cells 110 in predefined or fixed locations. The cell holders 130, 135 can be produced, fabricated, molded or made via injection molding for example, using for instance a plastics-based material that is flame resistant plastic material, flame resistant plastic material that includes flame retardant additives, non-flammable plastic material, or an electrical insulator. Examples of suitable materials for the cell holders 130, 135 can include plastic material, acrylonitrile butadiene styrene (ABS) material, or polycarbonate material.

The material and structural configuration of the cell holders 130, 135 can provide spatial separation between cells such that creepage or clearance (creepage-clearance) requirements are met or exceeded for supporting a certain voltage across terminals of a battery package 405 (e.g., 400 V, or 450 V) or of a battery module 100 (e.g., 60 V) that is implemented using the battery blocks 105. Creepage can refer to a separation (e.g., shortest distance) between connection or weld points between (e.g., like-terminals of) battery cells 110 as measured along a surface of a bus-bar, circuit board or other connecting structure. Clearance can refer to a separation (e.g., shortest distance) between connection or weld points between (e.g., like-terminals of) battery cells 110 as measured through air or space.

The cell holders 130, 135 can provide spatial separation between adjacent battery cells 110 of less than 1 mm (or less than 1.2 mm, or less than 2 mm, or other predetermined values or ranges). Adjacent battery cells 110 can refer to closest neighbor battery cell 110 pairs. Spatial separation may be uniform across adjacent battery cell 110 pairs or may vary across certain groups of battery cell 110 pairs. The arrangement of battery cells 110 within the battery block 105, including the spatial separation between adjacent battery cells 110, can provide a volumetric energy density that is higher than that of single battery cell implementations. The spatial separation between adjacent battery cells 110 can allow for suitable or sufficient thermal dissipation between battery cells 110, avoidance of electrical arcing between battery cells 110, and possibly other protective features. The cell holders 130, 135 can incorporate structures, such as channels or routing vents, to receive, direct or release high energy or high pressure gaseous release. The channels or routing vents can receive gaseous release through vents incorporated in the battery cells 110, for instance by coupling to these vents. The cell holders 130, 135 can include material that is suitably thermally conductive, to transfer, propagate and dissipate heat resulting from the battery cells 110.

FIG. 1, among others, depicts an example system to power electric vehicles. In FIG. 1, a battery module 100 is provided having two battery blocks 105 (e.g., a first battery block 105 and a second battery block 105). The first and second battery blocks 105 can be subcomponents of the battery module 100. A battery module 100 as described herein can refer to a battery system having multiple battery blocks 105 (e.g., two or more). For example, multiple battery blocks 105 can be electrically coupled with each other to form a battery module 100. The battery modules 100 can be formed having a variety of different shapes. For example, the shape of the battery modules 100 can be determined or selected to accommodate a battery pack within which a respective battery module 100 is to be disposed. The shape of the battery modules 100 may include, but not limited to, a square shape, rectangular shape, circular shape, or a triangular shape. Battery modules 100 in a common battery pack can have the same shape. One or more battery modules 100 in a common battery pack can have a different shape from one or more other battery modules 100 in the common battery pack.

The number of battery blocks 105 in a battery module 100 can vary and can be selected based at least in part on an amount of energy or power to be provided to an electric vehicle. For example, the battery module 100 can couple with one or more bus-bars within a battery pack or couple with a battery pack of an electric vehicle to provide electrical power to other electrical components of the electric vehicle. The battery module 100 includes multiple battery blocks 105. The battery module 100 can include multiple cell holders 130, 135 to hold or couple the battery blocks 105 together, and to couple the battery cells 110 to form the battery blocks 105 together.

Battery blocks 105 can be held together using one or more cell holders 130, 135. For example, a single one of cell holders 130, 135 can house at least two battery blocks 105 in a single plastic housing. The battery cells 110 can be positioned within the respective one of the cell holder 130, 135 using adhesive material (e.g., 2-part epoxy, silicone-based glue, or other liquid adhesive), heat staking, or press fit. The battery cells 110 can be positioned within the respective one of the cell holder 130, 135 to hold them in place. For example, the battery cells 110 can have a tolerance in height as part of the manufacturing process. This tolerance can be accounted for by locating either the top or bottom of the respective battery cells 110 to a common plane and fixing them there within the respective one of the cell holder 130, 135. For example, a bottom end of each of the battery cells 110 can be positioned flat relative to each other to provide a flat mating surface to a cold plate. The top end of the battery cells 110 can be positioned flat relative to the first cell holder 130 to provide or form a flat plane for forming battery cell to current collector connections (e.g., wirebonding, laser welding). The flat plane may only be provided on a top or bottom plane of the battery cells 110 because the cell holders 130, 135 can be retained in the respective battery module 100 using adhesive material (e.g., 2-part epoxy, silicone-based glue, or other liquid adhesive), bolts/fasteners, pressure sensitive adhesive (PSA) tape, or a combination of these materials. The structure of the battery module 100 that the cell holders 130, 135 are placed in or disposed in can include a stamped, bent, or formed metal housing or could be a plastic housing made by injection molding or another manufacturing method.

The first and second battery blocks 105 include a plurality of battery cells 110. The battery cells can be homogeneous or heterogeneous in one or more aspects, such as height, shape, voltage, energy capacity, location of terminal(s) and so on. The first battery block 105 may include the same number of battery cells 110 as the second battery block, or the first battery block 105 may have a different number of battery cells 110 (e.g., greater than, less than) the second battery block 105. The first and second battery blocks 105 can include any number of battery cells 110 arranged in any configuration (e.g., an array of N×N or N×M battery cells, where N, M are integers). For example, a battery block 105 may include two battery cell 110 or fifty battery cells 110. The number of battery cells 110 included within a battery block 105 can vary within or outside this range. The number of battery cells 110 included within a battery block 105 can vary based in part on battery cell level specifications, battery module level requirements, battery pack level requirements or a combination of these that you are trying to obtain or reach with the respective battery block 105. The number of battery cells 110 to include in a particular battery block 105 can be determined based at least in part on a desired capacity of the battery block 105 or a particular application of the battery block 105. For example, a battery block 105 can contain a fixed "p" amount of battery cells, connected electrically in parallel which can provide a battery block capacity of "p" times that of the single battery cell capacity. The voltage of the respective battery block 105 (or cell block) can be the same as that of the single battery cell 110 (e.g., 0V to 5V or other ranges), which could be treated as larger cells that can be connected in series into the battery module 100 for battery packs for example. For example, the plurality of cylindrical battery cells 110 can provide a battery block capacity to store energy that is at least five times greater than a battery cell capacity of each of the plurality of cylindrical battery cells 110. The battery blocks 105 can have a voltage of up to 5 volts across the pair of battery block terminals of the respective battery block 105.

The battery blocks 105 can each include one or more battery cells 110 and each of the plurality of battery cells 110 can have a voltage of up to 5 volts (or other limit) across terminals of the corresponding battery cell. For example, the battery blocks 105 can include an arrangement of a plurality of battery cells 110 electrically connected in parallel. Each cell of the plurality of battery cells can be spatially separated from each of at least one adjacent cell by, for example, two millimeter (mm) or less. The arrangement of the plurality of battery cells can form a battery block 105 for storing energy and can have a voltage of up to 5 volts across terminals of the respective battery block 105.

For instance, a single battery cell 110 can have a maximum voltage of 4.2V, and the corresponding battery block 105 can have a maximum voltage of 4.2V. By way of an example, a battery block 105 using 5 volts/5 Ampere-hour (5V/5 Ah) cells with 60 cells in parallel can become a 0V to 5V, 300 Ah modular unit. The battery block 105 can have high packaging efficiency by utilizing the safest minimum cell to cell spacing (e.g., any value from 0.3 mm to 2 mm) that prevents thermal propagation within the block with each cell having an individual and isolated vent port for instance. For example, spatial separation between adjacent cells of less than 1 mm can be implemented in the present battery blocks 105. The battery block 105 can thus be small, e.g., less than 0.05 cubic feet, giving it a high volumetric energy density for high packing efficiency.

Figure 2:
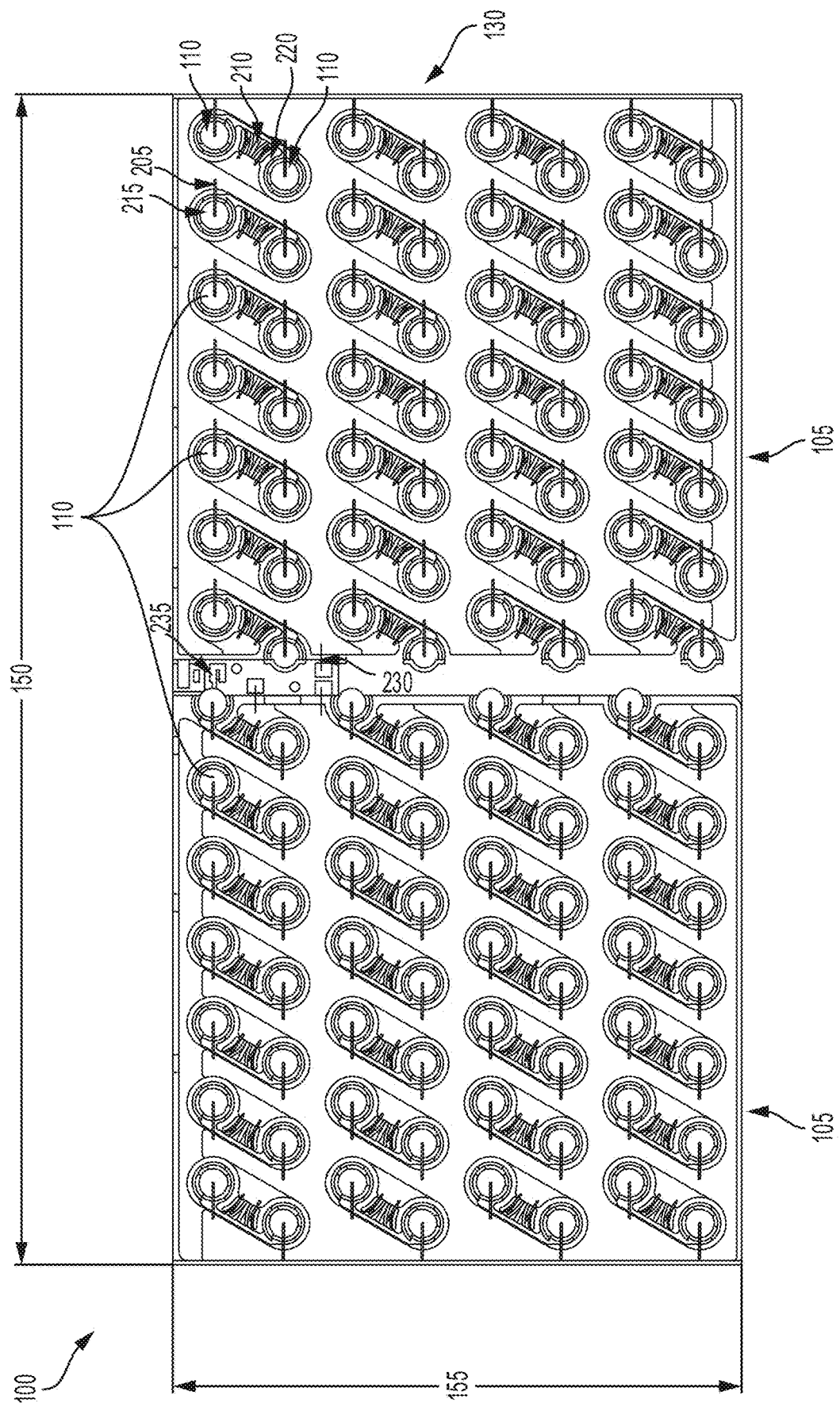
FIG. 2 depicts a top view of an example system for providing energy storage.
Figure 3:
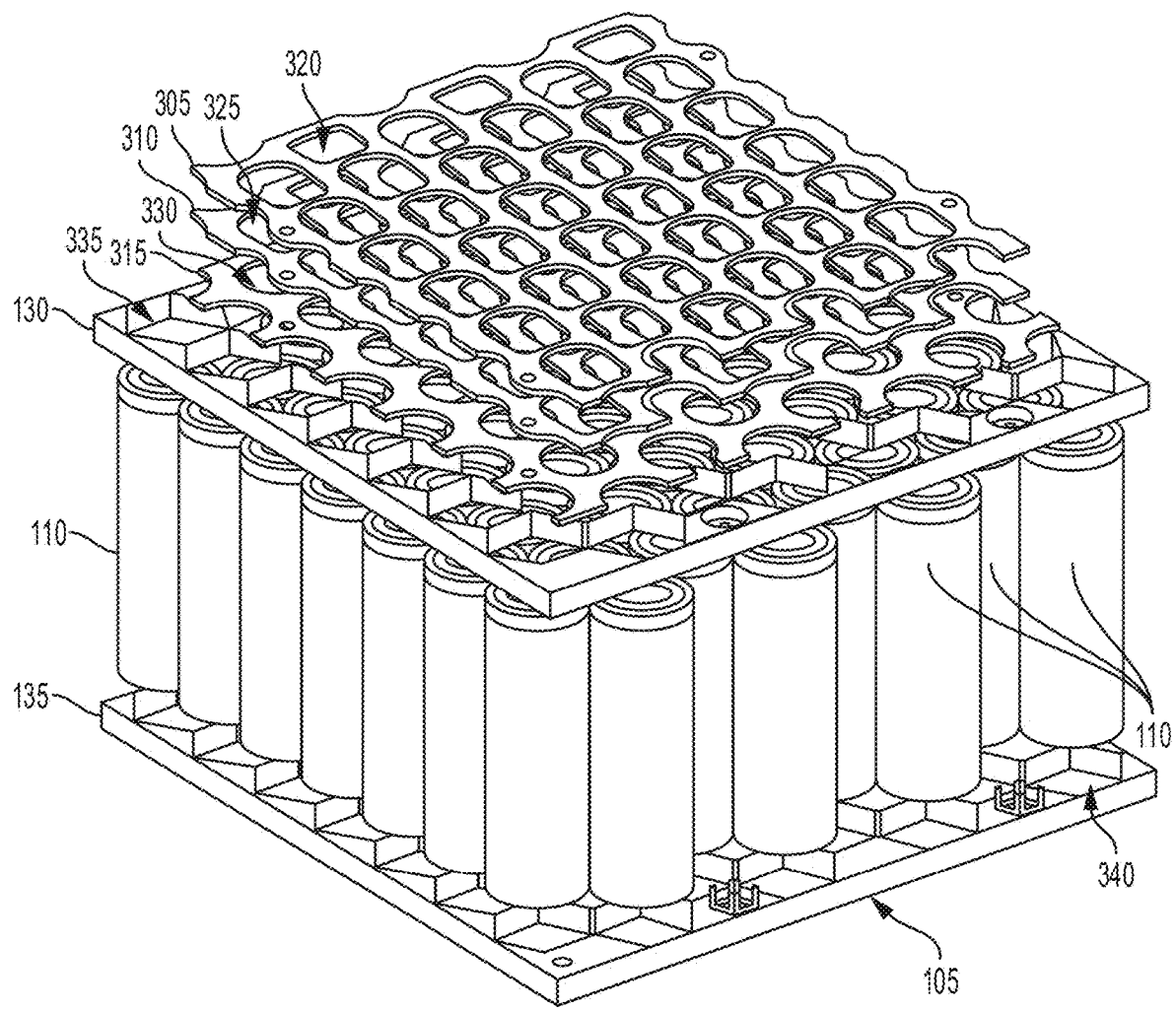
FIG. 3 depicts an exploded view of a top view of an example system for providing energy storage.

The battery block 105 can include battery cells 110 physically arranged in parallel to each other along the longest dimension of each battery cell 110. The battery cells 110 can be arranged physically as a two dimensional array of battery cells 110 (e.g., as shown in FIGS. 1-3), or can be arranged physically as a three dimensional array of battery cells 110. For example, the battery cells 110 can be arranged in an array formation having three values, such as a length value 150, a height value (or depth value) 160, and a width value 155 to form the battery block 105. As depicted in FIG. 1, the battery block 105 can have a dimension of length 150×width 155×height 160. The battery block 105 can have a length value 150 of 200 mm, a width value 155 of 650 mm, and a height value 160 of 100 mm. The length 150 may range from 25 mm to 700 mm. The width 155 may range from 25 mm to 700 mm. The height 160 (or depth) may range from 65 mm to 150 mm. The height 160 of the battery block 105 may correspond to (or be dictated by) the height or longest dimension of a component the battery cell 110.

The battery blocks 105 may form or include an enclosure or housing. For example, the plurality of battery cells 110 can be enclosed in an battery block enclosure. The battery block enclosure can be formed in a variety of different shapes, such as but not limited to, a rectangular shape, a square shape or a circular shape. The battery block enclosure can be formed having a tray like shape and can include a raised edge or border region. The battery cells 110 can be held in position by the raised edge or border region of the battery block enclosure. The battery block enclosure can be coupled with, in contact with, or disposed about the plurality of battery cells 110 to enclose the plurality of battery cells 110. For example, the battery block enclosure can be formed such that it at least partially surrounds or encloses each of the battery cells 110. The battery block enclosure can be configured to be less than 1 cubic feet in volume. For example, the battery block 105 enclosure can be configured to be less than 0.05 cubic feet in volume. The battery block 105 enclosure can be configured to be less than 0.15 cubic feet in volume.

The battery cells 110 can be provided or disposed in the first and second battery blocks 105 and can be arranged in one or more rows and one or more columns of battery cells 110. Each of the rows or columns of battery cells 110 can include the same number of battery cells 110 or they can include a different number of battery cells 110. The battery cells 110 can be arranged spatially relative to one another to reduce overall volume of the battery block 105, to allow for minimum cell to cell spacing (e.g., without failure or degradation in performance), or to allow for an adequate number of vent ports. The rows of battery cells 110 can be arranged in a slanted, staggered or offset formation relative to one another (see FIG. 2). The battery cells 110 can be placed in various other formations or arrangements.

Each of the battery cells 110 in a common battery block 105 (e.g., same battery block 105) can be spaced from a neighboring or adjacent battery cell 110 in all directions by a distance that ranges from 0.5 mm to 3 mm (e.g., 1.5 mm spacing between each battery cell 110, 2 mm spacing between each battery cell 110). The battery cells 110 in a common battery block 105 can be uniformly or evenly spaced. For example, each of the battery cells 110 can be spaced the same distance from one or more other battery cells 110 in the battery blocks 105. One or more battery cells 110 in a common battery block 105 can be spaced one or more different distances from another one or more battery cells 110 of the common battery block 105. Adjacent battery cells 110 between different battery blocks 105 can be spaced a distance in a range from 1 mm to 6 mm. The distances between the battery cells 110 of different battery blocks 105 can vary across applications and configurations, and can be selected based at least in part on the dimensions of the battery blocks 105, electrical clearance or creepage specifications, or manufacturing tolerances for the respective battery module 100.

The battery block 105 can provide a battery block capacity of up to 300 Ampere-hour (Ah) or more. The battery block 105 can provide varying capacity values. For example, the battery block 105 can provide a capacity value that corresponds to a total number of cylindrical battery cells 110 in the plurality of cylindrical battery cells 110 forming the respective battery block 105. For example, the battery block 105 can provide a battery block capacity in a range from 8 Ah to 600 Ah.

The battery blocks 105 can be formed having a variety of different shapes. For example, the shape of the battery blocks 105 can be determined or selected to accommodate a battery module 100 or battery pack within which a respective battery block 105 is to be disposed. The shape of the battery blocks 105 may include, but not limited to, a square shape, rectangular shape, circular shape, or a triangular shape. Battery blocks 105 in a common battery module 100 can have the same shape or one or more battery blocks 105 in a common battery module 100 can have a different shape from one or more other battery blocks 105 in the common battery module 100.

The battery blocks 105 can each include at least one cell holder 130, 135 (sometimes referred as a cell holder). For example, the first and second battery blocks 105 can each include a first cell holder 130 and a second cell holder 135. The first cell holder 130 and the second cell holder 135 can house, support, hold, position, or arrange the battery cells 110 to form the first or second battery blocks 105 and may be referred to herein as structural layers. For example, the first cell holder 130 and the second cell holder 135 can hold the battery cells 110 in predetermined positions or in a predetermined arrangement to provide the above described spatial separation (e.g., spacing) between each of the battery cells 110. The first cell holder 130 can couple with or be disposed on or over a top surface of each of the battery cells 110. The second cell holder can couple with or contact a bottom surface of the each of the battery cells 110.

The first cell holder 130 and the second cell holder 135 can include one or more recesses, cutouts or other forms of holes or apertures configured to hold portions of the battery cells 110. The recesses, cutouts or other forms of holes or apertures of the first and second cell holders 130, 135 can be formed to conform or match with, or correspond to the dimensions of the battery cells 110. For example, each of the recesses, cutouts or other forms of holes or apertures can have the same dimensions (e.g., same diameter, same width, same length) as each of the battery cells 110 to be disposed within the respective recess, cutout, or other forms of holes or apertures. The battery cells 110 can be disposed within the recesses, cutouts or other forms of holes or apertures such that they are flush with an inner surface of the recesses, cutouts or other forms of holes or apertures. For example, an outer surface of each of the battery cells 110 can be in contact with the inner surface of the recesses, cutouts or other forms of holes or apertures of each of the first and second cell holders 130, 135 when the battery cells 110 are disposed within or coupled with the recesses, cutouts or other forms of holes or apertures of each of the first and second cell holders 130, 135.

The battery module 100 can include a single battery block 105 or multiple battery blocks 105 (e.g., two battery blocks 105, or more than two battery blocks 105). The number of battery blocks 105 in a battery module 100 can be selected based at least in part on a desired capacity, configuration or rating (e.g., voltage, current) of the battery module 100 or a particular application of the battery module 100. For example, a battery module 100 can have a battery module capacity that is greater than the battery block capacity forming the respective battery module 100. The battery module 100 can have a battery module voltage greater than the voltage across the battery block terminals of the battery block 105 within the respective battery module 100. The battery blocks 105 can be positioned adjacent to each other, next to each other, stacked, or in contact with each other to form the battery module 100. For example, the battery blocks 105 can be positioned such that a side surface of the first battery block 105 is in contact with a side surface of the second battery block 105. The battery module 100 may include more than two battery blocks 105. For example, the first battery blocks 105 can have multiple side surfaces positioned adjacent to or in contact with multiple side surfaces of other battery blocks 105. Various types of connectors can couple the battery blocks 105 together within the battery module 100. The connectors may include, but not limited to, straps, wires, ribbonbonds, adhesive layers, or fasteners. The electrical connections between battery blocks 105 and battery modules 100 can use aluminum or copper busbars (stamped/cut metallic pieces in various shapes) with fasteners, wires and ribbons (aluminum, copper, or combination of the two), press fit studs and connectors with copper cables, or bent/formed/stamped copper or aluminum plates.

FIG. 2 depicts a top view of the battery module 100 illustrating an example arrangement of the battery cells 110 in each of the first battery block 105 and the second battery block 105. The battery blocks 105 can include a pair of terminals 230, 235. For example, the battery blocks 105 include a first battery block terminal 230 and a second battery block terminal 235. The first battery block terminal 230 can correspond to a positive terminal and the second battery block terminal 235 can correspond to a negative terminal The plurality of cylindrical battery cells 110 can provide a battery block capacity to store energy that is at least five times greater than a battery cell capacity of each of the plurality of cylindrical battery cells 110. The battery blocks 105 can have a voltage of up to 5 volts across the pair of battery block terminals 230, 235. For example, the first battery block terminal 230 can be coupled with 5 V and the second battery block terminal 235 can be coupled with 0 v. The first battery block terminal 230 can be coupled with +2.5 V and the second battery block terminal 235 can be coupled with −2.5 V. Thus, a difference in voltage between the first battery block terminal 230 and the second battery block terminal 235 can be 5 V or up to 5 V.

The battery cells 110 in the first and second battery blocks 105 can be arranged in one or more rows and one or more columns of battery cells 110. The individual battery cells 110 can be cylindrical cells or other types of cells. Depending on the shape of each battery cell 110, the battery cells 110 can be arranged spatially relative to one another to reduce overall volume of the battery block 105, to minimize cell to cell spacing (e.g., without failure or degradation in performance), or to allow for an adequate number of vent ports. For instance, FIG. 2, among others, shows each row of battery cells 110 arranged in a slanted or offset formation relative to one another. The battery cells 110 can be placed in various other formations or arrangements.

Each of the battery cells 110 in a common battery block 105 (e.g., same battery block 105) can be spaced from a neighboring or adjacent battery cell 110 in all directions by a distance that ranges from 0.5 mm to 3 mm (e.g., 1.5 mm spacing between each battery cell 110, 2 mm spacing between each battery cell 110). For example, a first battery cell 110 can be spaced a distance of 1.5 mm from a neighboring second battery cell 110 and spaced a distance of 1.5 mm from a neighboring third battery cell 110. The battery cells 110 in a common battery block 105 can be uniformly spaced, or evenly spaced. One or more battery cells 110 in a common battery block 105 can be spaced one or more different distances from another one or more battery cells 110 of the common battery block 105.

The battery cells 110 (e.g., adjacent battery cells 110) between different battery blocks 105 (e.g., adjacent battery blocks) can be spaced a distance in a range from 2 mm to 6 mm. For example, one or more battery cells 110 disposed along an edge of a first battery block 105 can be spaced a distance in a range from 0 mm to 1 mm (e.g., 0.5 mm) from the edge of the first battery block 105 and one or more battery cells 110 disposed along an edge of a second battery block 105 can be spaced a distance in a range from 0 mm to 1 mm (e.g., 0.5 mm) from the edge of the second battery block 105. The edges of the first and second battery blocks 105 can be coupled with each other, in contact with each other, or facing each other such that the one or more battery cells 110 disposed along the edge of the first battery block 105 are spaced from the one or more battery cells 110 disposed along the edge of the second battery block 105 a distance in a range from 2 mm to 6 mm (e.g., 4.5 mm). The distances between the battery cells 110 of different battery blocks 105 can vary and can be selected based at least in part on the dimensions of the battery blocks 105, electrical clearance or creepage specifications, or manufacturing tolerances for the respective battery module 100. For example, battery cells 110 can be spaced a distance from a second, different battery cell 110 based on predetermined manufacturing tolerances that may control or restrict how close battery cells 110 can be positioned with respect to each other.

The battery cells 110 can each couple with a first layer (e.g., positive conductive layer) of the first cell holder 130. For example, the first cell holder 130 can include multiple layers, such as, a first layer forming a positive current collector (e.g., conductive positive layer 305 of FIG. 3), an isolation layer having non-conductive material, and a second layer forming negative current collector (e.g., conductive negative layer 315 of FIG. 3). Each of the battery cells 110 can include a pair of terminals 215, 220. For example, the battery cells 110 can include a positive terminal 215 and a negative terminal 220. The pair of terminals 215, 220 of each of the battery cells 110 can have up to 5 V across their respective terminals. For example, the positive terminal 215 can be coupled with +5 V and the negative terminal 220 can be coupled with 0 V. The positive terminal 215 can be coupled with +2.5 V and the negative terminal 220 can be coupled with −2.5 V. Thus, the difference in voltage between the positive terminal 215 and the negative terminal 220 of each battery cell 110 can be 5 v or in any value up to and including 5 V.

The positive terminal 215 of a battery cell 110 can be connected using a wirebond 205 or otherwise, with the first layer of the first cell holder 130. The negative terminal 220 or negative surface of a battery cell 110 can connect with the second layer of the first cell holder 130 through the negative tab 210. The positive terminal 215 and the negative terminal 220 of a battery cell 110 can be formed on or coupled with at least a portion of the same surface (or end) of the respective battery cell 110. For example, the positive terminal 215 can be formed on or coupled with a first surface (e.g., top surface, side surface, bottom surface) of the battery cell 110 and the negative terminal 220 of the battery cell 110 can be formed on or coupled with the same first surface. Thus, the connections to positive and negative bus-bars or current collectors can be made from the same surface (or end) of the battery cell 110 to simplify the installation and connection of the battery cell 110 within a battery block 105.

The negative tab 210 can couple at least two battery cells 110 with a conductive negative layer (e.g., conductive negative layer 315 of FIG. 3) of the first cell holder 130. The negative tab 210 can be part of the conductive negative layer, for example formed as an extension or structural feature within a plane of the conductive negative layer, or partially extending beyond the plane. The negative tab 210 can include conductive material, such as but not limited to, metal (e.g., copper, aluminum), or a metallic alloy or material. The negative tab 210 can form or provide a contact point to couple a battery cell 110 to a negative current collector of the first cell holder 130. The negative tab 210 can couple with or contact a top portion or top surface (e.g., negative terminal 220) of the battery cell 110. The negative tab 210 can couple with or contact a side surface of a battery cell 110. The negative tab 210 can couple with or contact a bottom portion or bottom surface of a battery cell 110. The surface or portion of a battery cell 110 the negative tab 210 couples with or contacts can correspond to the placement of the first cell holder 130 relative to the battery cell 110.

The negative tab 210 can have a shape configured to couple with or contact surfaces of at least two battery cells 110. The negative tab 210 can be formed in a variety of different shapes and have a variety of different dimensions (e.g., conformed to the dimensions of the battery cells 110 and their relative positions). The shape of the negative tab 210 can include, but not limited to, rectangular, square, triangular, octagon, circular shape or form, or one or more combinations of rectangular, square, triangular, or circular shape or form. For example, the negative tab 210 can be formed having one or more sides (e.g., portions or edges) having a circular or curved shape or form to contact a surface of the battery cells and one or more sides having a straight or angled shape. The particular shape, form or dimensions of the negative tab 210 can be selected based at least in part on a shape, form or dimensions of the battery cells 110 or a shape, form or dimensions of the first cell holder 130. The shape and structure of the negative tab 210 can be formed in two or three dimensions. For example, one or more edges or portions of the negative tab 210 can be folded or formed into a shape or structure suitable for bonding to a negative terminal portion of a battery cell 110. For a two-dimensional negative tab 210 (e.g., a negative tab 210 with a thickness conformed with a thickness of the corresponding conductive negative layer), the negative tab 210 can include or be described with one or more parameters, such as length, a width, surface area, and radius of curvature. For a three-dimensional negative tab 210 (e.g., a negative tab 210 with at least a portion that does not conform with a thickness of the corresponding conductive negative layer), the negative tab 210 can include or be described with one or more parameters, including length, width, height (or depth, thickness), one or more surface areas, volume, and radius of curvature. The three-dimensional negative tab 210 can include a folded, curved or accentuated portion that provides a larger surface for a negative surface of a battery cell 110 to couple with or contact. For example, the three-dimensional negative tab 210 can have a greater thickness than a two-dimensional negative tab 210.

The wirebond 205 can be a positive wirebond 205 that can couple at least one battery cell 110 with a conductive positive layer (e.g., conductive positive layer 305 of FIG. 3) of the cell holder 130. The wirebond 205 can be formed in a variety of different shapes and have a variety of different dimensions. The particular shape or dimensions of wirebond 205 can be selected based at least in part on a shape or a dimension of the battery cells 110 or a shape or a dimension of the first cell holder 130. For example, the wirebond 205 can be sized to extend from a top surface, side surface or bottom surface of a battery cell 110. As depicted in FIG. 2, the wirebond 205 can extend from a top surface (e.g., a positive terminal 215) of a battery cell 110 and extend through apertures formed in each of the different layers forming the first cell holder 130, to contact a top surface of the conductive positive layer (e.g., conductive positive layer 305 of FIG. 3) of the cell holder 130. The shape of the wirebond 205 can be selected or implemented so as not to contact a negative layer of the first cell holder 130 as the wirebond 205 extends through the different layers forming the first cell holder 130. The shape or form of the wirebond 205 can include a rectangular shape, cylindrical shape, tubular shape, spherical shape, ribbon or tape shape, curved shape, flexible or winding shape, or elongated shape. The wirebond 205 can include electrical conductive material, such as but not limited to, copper, aluminum, metal, or metallic alloy or material.

FIG. 3, among others, provides an exploded view of an example battery block 105. The first cell holder 130 or the second cell holder 135 can include a plurality of layers (e.g., conductive layers, non-conductive layers) that couple the plurality of battery cells 110 with each other. Each of the first cell holder 130 and the second cell holder 135 can include alternating or interleaving layers of conductive layers and non-conductive layers. For example, each of the first cell holder 130 and the second cell holder 135 may include a positive conductive layer, an isolation layer having a non-conductive material, and a negative conductive layer.

FIG. 3 includes an example view of different layers of the first cell holder 130. In particular, FIG. 3 shows a second surface (e.g., bottom surface) of a first conductive layer 305 disposed over, coupled with, or in contact with a first surface (e.g., top surface) of a non-conductive layer 310. A second surface (e.g., bottom surface) of the non-conductive layer 310 is disposed over, coupled with, or in contact with a first surface (e.g., top surface) of a second conductive layer 315. A second surface (e.g., bottom surface) of the second conductive layer is disposed over, coupled with, or in contact with a first surface (e.g., top surface) of the first cell holder 130.

The first cell holder 130 can hold, house or align the first conductive layer 305, the non-conductive layer 310, and the second conductive layer 315. For example, the first cell holder 130 can include a border or raised edge formed around a border of the first cell holder 130 such that the first conductive layer 305, the non-conductive layer 310, and the second conductive layer 315 can be disposed within the border or raised edge. The border or raised edge formed around a border of the first cell holder 130 can hold the first conductive layer 305, the non-conductive layer 310, and the second conductive layer 315 in place and in physical contact with each other.

The first conductive layer 305, the non-conductive layer 310, the second conductive layer 315, the first cell holder 130, and the second cell holder 135 can include a plurality of apertures 320. The number of apertures 320 can be selected based in part on the size and dimensions of the first conductive layer 305, the non-conductive layer 310, the second conductive layer 315, the first cell holder 130, the second cell holder 135, and the battery cells 110. For example, the first conductive layer 305 can include a first plurality of apertures 320 having a first shape. The non-conductive layer 310 can include a second plurality of apertures 325 having a second shape. The second conductive layer 315 can include a third plurality of apertures 330 having a third shape. The first cell holder 130 can include a fourth plurality of apertures 335 having a fourth shape. The second cell holder 135 can include a fourth plurality of apertures 340 having a fifth shape. The apertures 320, 325, 330, 335, 340 can include an opening or hole formed through each of the respective layers, or a recess formed into the respective layers or structures.

The shape, dimensions, or geometry of one or more of the first plurality of apertures 320, the second plurality of apertures 325, the third plurality of apertures 330, the fourth plurality of apertures 335, and the fifth plurality of apertures 340 can be different. The shape, dimensions, or geometry of one or more of the first plurality of apertures 320, the second plurality of apertures 325, the third plurality of apertures 330, the fourth plurality of apertures 335, and the fifth plurality of apertures 340 can be the same or substantially similar. Two or more of the first, second, third, fourth and fifth shapes can be conformed at least in part relative to one other. Two or more of the first, second, third, fourth and fifth pluralities of apertures can be aligned relative to one other. The shape, dimensions, or geometry of the apertures 320, 325, 330, 335, 340 can be determined based at least in part on the shape, dimensions, or geometry of the battery cells 110. For example, the plurality of battery cells 110 can be disposed or positioned between a second surface (e.g., bottom surface) of the first cell holder 130 and a first surface (e.g., top surface) of the second cell holder 135. The first cell holder 130 or the second cell holder 135 can hold, house or align the plurality of battery cells 110 using the fourth plurality of apertures 335 or the fifth plurality of apertures 340, respectively. For example, each of the battery cells 110 can be disposed within the battery block 105 such that a bottom end or bottom portion of a battery cell 110 is disposed in, coupled with or on contact with at least one aperture of the fifth plurality of apertures 340 formed in the second cell holder 135, and a top end or top portion of a battery cell 110 is disposed in, coupled with or on contact with at least one aperture of the fourth plurality of apertures 335 formed in the first cell holder 130.

The apertures 320, 325, 330 of the first conductive layer 305, the non-conductive layer 310, and the second conductive layer 315 can allow a connection to a positive layer (e.g., first conductive layer 305) or negative layer (e.g., second conductive layer 315) from each of the battery cells 110. For example, a wirebond 205 can extend through the apertures 320, 325, 330 to couple a positive surface of a battery cell with the first conductive layer 305. Thus, the apertures 320, 325, 330 can be sized to have a diameter or opening that is greater than a diameter or cross-sectional shape of the wirebond 205. A negative tab 210 can extend from the second conductive layer 315 and contact negative surfaces on at least two battery cells 110. Thus, the apertures 320, 325, 330 can be sized to have dimensions that are greater than the dimensions of the negative tab 210. The shape of the apertures 320, 325, 330, 335, 340 can include a round, rectangular, square, or octagon shape or form as some examples. The dimensions of the apertures 320, 325, 330, 335, 340 can include a width of 21 mm or less for instance. The dimensions of one or more of the apertures 320, 325, 330, 335, 340 can be 12 mm in width and 30 mm in length for example.

The apertures 320, 325, 330 can be formed such that they are smaller than the apertures 335, 340. For example, the apertures 335 and 340 can have a diameter in a range from 10 mm to 35 mm (e.g., 18 mm to 22 mm). The apertures 320, 325, 330 can have a diameter in a range from 3 mm to 33 mm. If the apertures 335, 340 are formed having a square or rectangular shape, the apertures 335, 340 can have a length in a range from 4 mm to 25 mm (e.g., 10 mm). If the apertures 335, 340 are formed having a square or rectangular shape, the apertures 335, 340 can have a width in a range from 4 mm to 25 mm (e.g., 10 mm). For example, the apertures 335, 340 can have dimensions of 10 mm×10 mm. If the apertures 320, 325, 330 are formed having a square or rectangular shape, the apertures 320, 325, 330 can have a length in a range from 2 mm to 20 mm (e.g., 7 mm). If the apertures 320, 325, 330 are formed having a square or rectangular shape, the apertures 320, 325, 330 can have a width in a range from 2 mm to 20 mm (e.g., 7 mm). For example, the apertures 320, 325, 330 can have dimensions of 7 mm×7 mm.

Apertures 325 can be formed such that they are smaller (e.g., have smaller dimensions) or offset with respect to apertures 320. For example, apertures 325 can correspond to apertures 320, such as having the same geometric shape with just an offset to make the apertures 325 smaller with respect to apertures 320. For example, the offset can be in a range from 0.1 mm to 6 mm depending on isolation, creepage, and clearance requirements. Apertures 325 can be sized the same as or identical to aperture 320.

The apertures 320, 325, 330 can be formed in a variety of shapes. For example, the apertures 320, 325, 330 may not be formed as distinct patterned openings or formed having distinct patterned openings. For example, the apertures 320, 325, 330 can be formed as a geometric cut from the sides of the respective one of layers 305, 310, 315. The apertures 320, 325, 330 can be formed as half circular cutouts around the perimeter of each of the respective one of layers 305, 310, 315, respectively.

The first conductive layer 305 and the second conductive layer 315 can include a conductive material, a metal (e.g., copper, aluminum), or a metallic material. The first conductive layer 305 can be a positive conductive layer or positively charged layer. The second conductive layer 315 can be a negative conductive layer or negatively charged layer. The first conductive layer 305 and the second conductive layer 315 can have a thickness in a range of 0.1 mm to 8 mm (e.g., 1.5 mm). The first conductive layer 305 and the second conductive layer 315 can have the same length as battery block 105. The first conductive layer 305 and the second conductive layer 315 can have the same width as battery block 105.

The non-conductive layer 310 can include insulation material, plastic material, epoxy material, FR-4 material, polypropylene materials, or formex materials. The dimensions or geometry of the non-conductive layer 310 can be selected to provide a predetermined creepage, clearance or spacing (sometimes referred to as creepage-clearance specification or requirement) between the first conductive layer 305 and the second conductive layer 315. For example, a thickness or width of the non-conductive layer 310 can be selected such that the first conductive layer 305 is spaced at least 3 mm from the second conductive layer 315 when the non-conductive layer 310 is disposed between the first conductive layer 305 and the second conductive layer 315. The non-conductive layer 310 can be formed having a shape or geometry that provides the predetermined creepage, clearance or spacing. For example, the non-conductive layer 310 can have a different dimension than that the first conductive layer 305 and the second conductive layer 315, such that an end or edge portion of the non-conductive layer 310 extends out farther (e.g., longer) than an end or edge portion of the first conductive layer 305 and the second conductive layer 315 relative to a horizontal plane or a vertical plane. The distance that an end or edge portion of the non-conductive layer 310 extends out can provide the predetermined creepage, clearance or spacing (e.g., 3 mm creepage or clearance). The thickness and insulating structure of the non-conductive layer 310, that separate the first conductive layer 305 from the second conductive layer 315, can provide the predetermined creepage, clearance or spacing. Thus, the dimensions of the non-conductive layer 310 can be selected, based in part, to meet creepage-clearance specifications or requirements. The dimensions of the non-conductive layer 310 can reduce or eliminate arcing between the first conductive layer 305 and the second conductive layer 315. The non-conductive layer 310 can have a thickness that ranges from 0.1 mm to 8 mm (e.g., 1 mm). The non-conductive layer 310 can have the same width as the battery block 105. For example, the non-conductive layer 310 can have a width in a range from 25 mm to 700 mm (e.g., 330 mm). The non-conductive layer 310 can have the same length as the battery block 105. For example, the non-conductive layer 310 can have a length in a range from 25 mm to 700 mm (e.g., 150 mm).

The first cell holder 130 and the second cell holder 135 can include plastic material, acrylonitrile butadiene styrene (ABS) material, polycarbonate material, or nylon material (e.g., PA66 nylon) with glass fill for instance. The rigidity of first cell holder 130 and the second cell holder 135 can correspond to the material properties forming the respective first cell holder 130 and the second cell holder 135, such as flexural modulus. The first cell holder 130 and the second cell holder 135 can have a dielectric strength of 300V/mil for instance (other values or ranges of the values are possible). The first cell holder 130 and the second cell holder 135 can for example have a tensile strength of 9,000 psi (other values or ranges of the values are possible. The first cell holder 130 and the second cell holder 135 can have a flexural modulus (e.g., stiffness/flexibility) of 400,000 psi (other values or ranges of the values are possible). The values for the dielectric strength, tensile strength, or flexural modulus can vary outside these values or range of values and can be selected based in part on a particular application of the first cell holder 130 and the second cell holder 135. The first cell holder 130 and the second cell holder 135 can have a flame resistance rating (e.g., FR rating) of UL 94 rating of V-0 or greater.

The first cell holder 130 and the second cell holder 135 can have a weldability specifications and UV transmission specifications. For example, if the first cell holder 130 and the second cell holder 135 can be coupled using welding. UV transmission can be important if the first cell holder 130, the second cell holder 135 or any component of the battery block 105 is coupled or assembled using an UV curable adhesive. For example, the first cell holder 130 or the second cell holder 135 can be formed using laser welding. The laser used for the laser welding can have a wavelength selected based in part on the type of laser and a color of the material forming the first cell holder 130 or the second cell holder 135. The wavelength of the laser used for laser welding can be in a range from 800 nm to 1000 nm (e.g., 900 nm). The materials forming the first cell holder 130 or the second cell holder 135 can include laser absorption properties. For example, the laser absorption properties can be achieved using an opaque color material or including carbon content material. For UV transmission, the first cell holder 130 or the second cell holder 135 can include material having one or more portions or surfaces that are white, off-white, or ideally transparent to allow for UV transmission. For example, for UV transmission can be in a range from 370 nm to 405 nm (e.g., 390 nm). The first cell holder 130 or the second cell holder 135 can have a UL 94 (e.g., plastics flammability of plastic materials) rating of V-0 that corresponds to a thickness of a wall portion of the respective layer. For example, the thinner a wall thickness is the more difficult it can be to achieve a V-0 rating. Thus, the first cell holder 130 or the second cell holder 135 can have a thickness between 0.5 mm to 2.5 mm.

Figure 4:
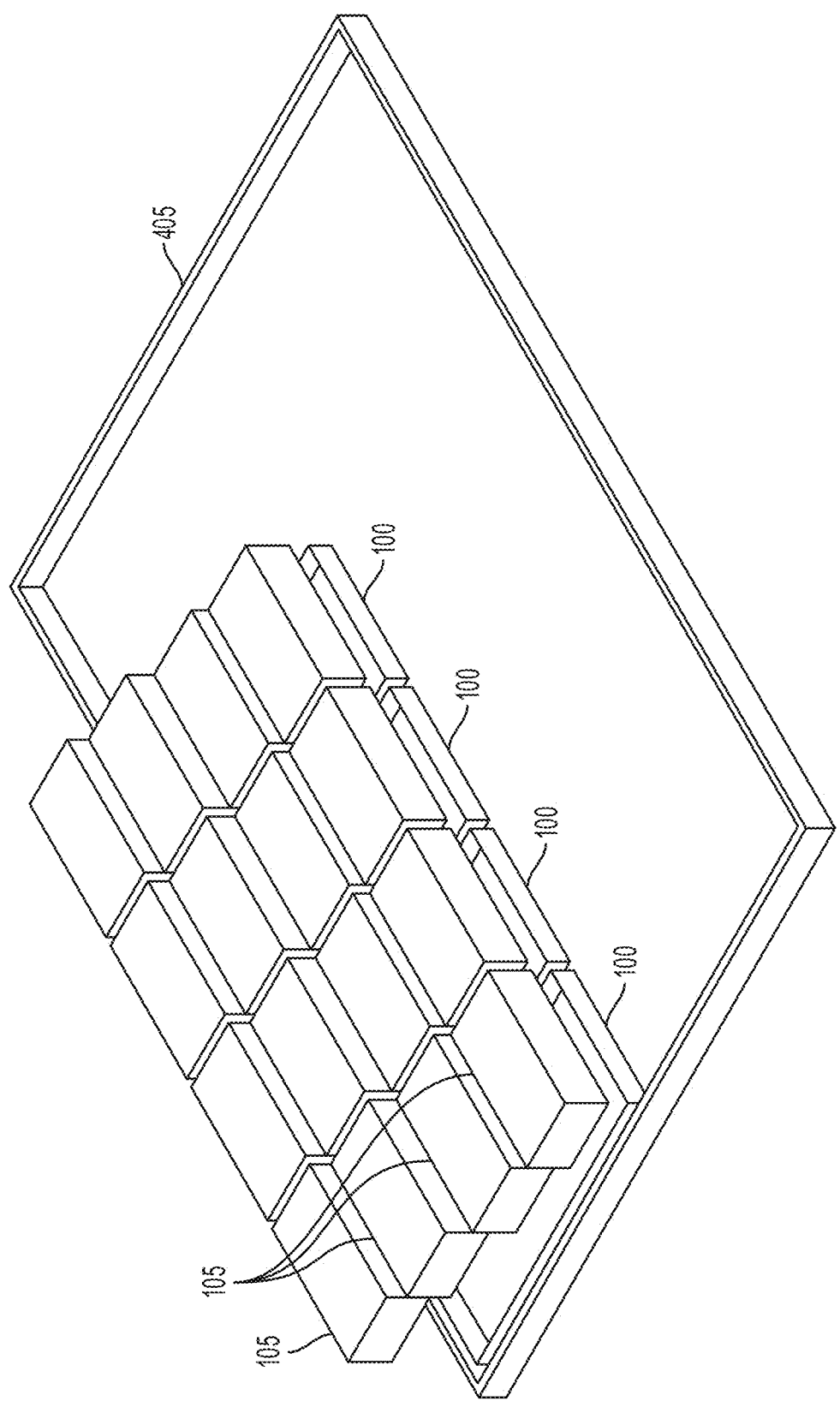
FIG. 4 depicts an illustrative embodiment of an example system to provide energy storage as a modular unit.
Figure 5:
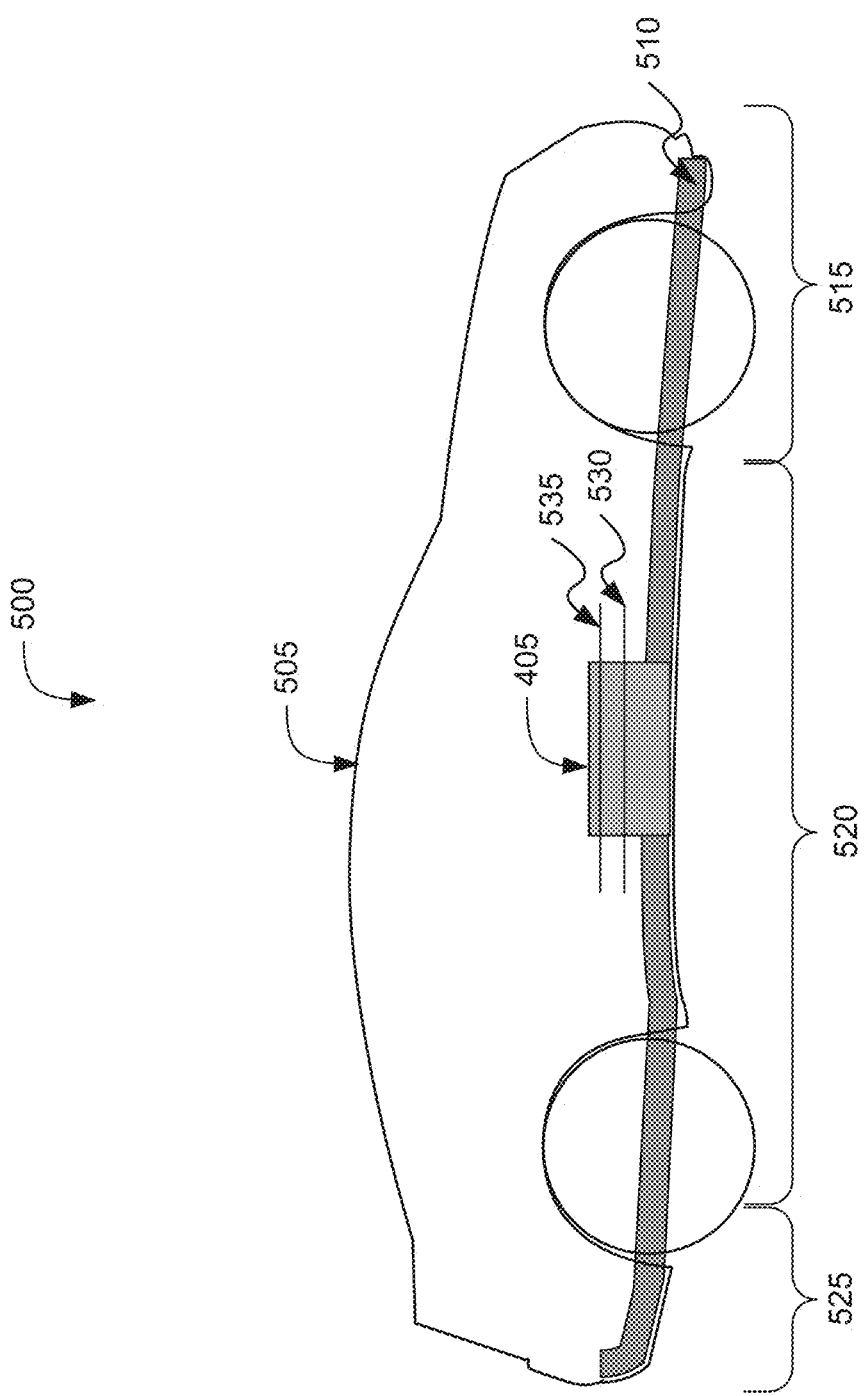
FIG. 5 is a block diagram depicting a cross-sectional view of an example electric vehicle installed with a battery pack.

Now referring to FIG. 4, among others, a battery pack 405 is depicted having a plurality of battery modules 100, with each of the battery modules 100 having a plurality of battery blocks 105. The battery blocks 105 may include a plurality of battery cells 110. A battery pack 405 as described herein can refer to a battery system having multiple battery modules 100 (e.g., two or more). Multiple battery modules 100 can be electrically coupled with each other to form a battery pack 405, using one or more electrical connectors such as bus-bars. For example, battery blocks 105 can be electrically coupled or connected to one or more other battery blocks 105 to form a battery module 100 or battery pack 405 of a specified capacity and voltage. The number of battery blocks 105 in a single battery module 100 can vary and can be selected based at least in part on a desired capacity of the respective battery module 100. The number of battery modules 100 in a single battery pack 405 can vary and can be selected based at least in part on a desired capacity of the respective battery pack 405. For example, the number of battery modules 100 in a battery pack 405 can vary and can be selected based at least in part on an amount of energy to be provided to an electric vehicle. The battery pack 405 can couple or connect with one or more bus-bars of a drive train system of an electric vehicle to provide electrical power to other electrical components of the electric vehicle (e.g., as depicted in FIG. 5).

The battery blocks 105 and the battery modules 100 can be combinable with one or more other battery blocks 105 and battery modules 100 to form the battery pack 405 of a specified capacity and a specified voltage that is greater than that across the terminals of the battery block 105 or battery module 100. For instance, a high-torque motor may be suitably powered by a battery pack 405 formed with multiple battery cells (e.g., 500 cells), blocks 105 or modules 100 connected in parallel to increase capacity and to increase current values (e.g., in Amperes or amps) that can be discharged. A battery block 105 can be formed with 20 to 50 battery cells 110 for instance, and can provide a corresponding number of times the capacity of a single battery cell 110. A battery pack 405 formed using at least some battery blocks 105 or battery modules 100 connected in parallel can provide a voltage that is greater than that across the terminals of each battery block 105 or battery module 100. A battery pack 405 can include any number of battery cells 110 by including various configurations of battery blocks 105 and battery modules 100.

The battery module 100 or battery pack 405 having one or more battery blocks 105 can provide flexibility in the design of the battery module 100 or the battery pack 405 with initially unknown space constraints and changing performance targets. For example, standardizing and using small battery blocks 105 can decrease the number of parts (e.g., as compared with using individual cells) which can decrease costs for manufacturing and assembly. The battery modules 100 or battery packs 405 having one or more battery blocks 105 as disclosed herein can provide a physically smaller, modular, stable, high capacity or high power device that is not available in today's market, and can be an ideal power source that can be packaged into various applications.

The shape and dimensions of the battery pack 405 can be selected to accommodate installation within an electric vehicle. For example, the battery pack 405 can be shaped and sized to couple with one or more bus-bars of a drive train system (which includes at least part of an electrical system) of an electric vehicle. The battery pack 405 can have a rectangular shape, square shape, or a circular shape, among other possible shapes or forms. The battery pack 405 (e.g., an enclosure or outer casing of the battery pack 405) can shaped to hold or position the battery modules 100 within a drive train system of an electric vehicle. For example, the battery pack 405 can be formed having a tray like shape and can include a raised edge or border region. Multiple battery modules 100 can be disposed within the battery pack 405 can be held in position by the raised edge or border region of the battery pack 405. The battery pack 405 may couple with or contact a bottom surface or a top surface of the battery modules 100. The battery pack 405 can include a plurality of connectors to couple the battery modules 100 together within the battery pack 405. The connections may include, but not limited to, straps, wires, adhesive materials, or fasteners.

The battery blocks 105 can be coupled with each other to form a battery module 100 and multiple battery modules 100 can be coupled with each other to form a battery pack 405. The number of battery blocks 105 in a single battery module 100 can vary and be selected based at least in part on a desired capacity or voltage of the respective battery module 100. The number of battery modules 100 in a single battery pack 405 can vary and be selected based at least in part on a desired capacity of the respective battery pack 405. For instance, a high-torque motor may be suitably powered by a battery pack 405 having multiple battery modules 100, the battery modules 100 having multiple battery blocks 105 and the battery blocks 105 having multiple battery cells 110. Thus, a battery pack 405 can be formed with a total number of battery cells ranging from 400 to 600 (e.g., 500 battery cells 110), with the battery blocks 105 or battery modules 100 connected in parallel to increase capacity and to increase current values (e.g., in Amperes or amps) that can be discharged. A battery block 105 can be formed with any number of battery cells 110 and can provide a corresponding number of times the capacity of a single battery cell 110.

For example, a single battery block 105 can include a fixed number of battery cells 110 wired in parallel ("p" count) and have the same voltage with that of the battery cell 110, and "p" times the discharge amps. A single battery block 105 can be wired in parallel with one or more battery blocks 105 to make a larger "p" battery block 105 for higher current applications, or wired in series as a module/unit to increase voltage. Additionally, a battery block 105 can be packaged into varying applications and can be configured to meet various standard battery sizes as defined by regulating bodies (e.g., Society of Automotive Engineers (SAE), United Nations Economic Commission for Europe (UN-ECE), German Institute for Standardization (DIN)) for different industries, countries, or applications.

A battery block 105 that is standardized or modularized into a building block or unit, can be combined or arranged with other battery blocks 105 to form a battery module 100 (or battery pack 405) that can power any device or application, e.g., PHEV, REV, EV, automotive, low voltage 12 volt system, 24 volt system, or 48 volt system, 400 volt system, 800 volt system, 1 kilovolt system, motorcycle/small light duty applications, enterprise (e.g., large or commercial) energy storage solutions, or residential (e.g., small or home) storage solutions, among others.

In accordance with the concepts disclosed herein, battery components are standardized or modularized at the battery block level rather than at the battery module level. For example, each of the battery cells 110 can be formed having the same shape and dimensions. Each of the battery blocks 105 can be formed having the same shape and dimensions. Each of the battery modules 100 can be formed having the same or different shape and dimensions. Thus, battery cells 110 can be individually replaced or additional battery cells 110 can be added to increase the capacity of the respective battery block 105. Battery blocks 105 can be individually replaced or additional battery blocks 105 can be added to increase the capacity of the respective battery module 100. For example, the plurality battery modules can have a battery module capacity that are greater than the battery block capacity. Each of the plurality of battery modules can have a battery module voltage greater than the voltage across the battery block terminals of the first battery block. Battery modules 100 can be individually replaced or additional battery modules 100 can be added to increase the capacity of the respective battery pack 405. In some applications or embodiments, standardization or modularization at the battery module level can be implemented instead of, or in addition to that at the battery block level.

For example, consider the above example of a 5V/300 Ah battery block. For comparative purposes, current single battery cells of 5V/50 Ah technologies can be 0.03 cubic feet and six of these single cell batteries connected in parallel would make this 0.18 cubic feet in size. This is multiple times larger than a corresponding battery block disclosed herein (e.g., 0.05 cubic feet). Thus, other single cell technologies offer no volumetric advantage, and instead provide an increased hazard or failure risk.

The battery modules 100 or battery block 105 disclosed herein can overcome packaging constraints, and can meet various performance targets using the same voltage of each component battery cell (0-5V) but with "p" times the discharge amps (e.g., discharge amps multiplied by the number of cells connected in parallel in the battery block). The battery modules 100 or battery block 105 can be configured into battery packs 405 of various size, power and energy to meet different product performance requirements with the best packing efficiency and volumetric energy density that matches a specific design.

A battery block 105 can allow flexibility in the design of a battery module or a battery pack 405 with initially unknown space constraints and changing performance targets. Standardizing and using battery blocks 105 (which are each smaller in size than a battery module 100) can decrease the number of parts (e.g., as compared with using individual cells) which can decrease costs for manufacturing and assembly. A standardized battery module, on the other hand, can limit the types of applications it can support due to its comparatively larger size and higher voltage. Standardizing battery modules 100 with nonstandard blocks 105 can increase the number of parts which can increase costs for manufacturing and assembly. In comparison, a battery block 105 as disclosed herein can provide a modular, stable, high capacity or high power device, such as a battery module 100 or battery pack 405, that is not available in today's market, and can be an ideal power source that can be packaged into various applications.

FIG. 5 depicts a cross-section view 500 of an electric vehicle 505 installed with a battery pack 405. The electric vehicle 505 can include an autonomous, semi-autonomous, or non-autonomous human operated vehicle. The electric vehicle 505 can include a hybrid vehicle that operates from on-board electric sources and from gasoline or other power sources. The electric vehicle 505 can include automobiles, cars, trucks, passenger vehicles, industrial vehicles, motorcycles, and other transport vehicles. The electric vehicle 505 can include a chassis 510 (sometimes referred to herein as a frame, internal frame, or support structure). The chassis 510 can support various components of the electric vehicle 505. The chassis 510 can span a front portion 515 (sometimes referred to herein a hood or bonnet portion), a body portion 520, and a rear portion 525 (sometimes referred to herein as a trunk portion) of the electric vehicle 505. The front portion 515 can include the portion of the electric vehicle 505 from the front bumper to the front wheel well of the electric vehicle 505. The body portion 520 can include the portion of the electric vehicle 505 from the front wheel well to the back wheel well of the electric vehicle 505. The rear portion 525 can include the portion of the electric vehicle 505 from the back wheel well to the back bumper of the electric vehicle 505.

The battery pack 405 can be installed or placed within the electric vehicle 505. For example, the battery pack 405 can couple with a drive train unit of the electric vehicle 505. The drive train unit may include components of the electric vehicle 505 that generate or provide power to drive the wheels or move the electric vehicle 505. The drive train unit can be a component of an electric vehicle drive system. The electric vehicle drive system can transmit or provide power to different components of the electric vehicle 505. For example, the electric vehicle drive train system can transmit power from the battery pack 405 to an axle or wheels of the electric vehicle 505. The battery pack 405 can be installed on the chassis 510 of the electric vehicle 505 within the front portion 515, the body portion 520 (as depicted in FIG. 5), or the rear portion 525. A first bus-bar 535 and a second bus-bar 530 can be connected or otherwise be electrically coupled with other electrical components of the electric vehicle 505 to provide electrical power from the battery pack 405 to the other electrical components of the electric vehicle 505.

Figure 6:
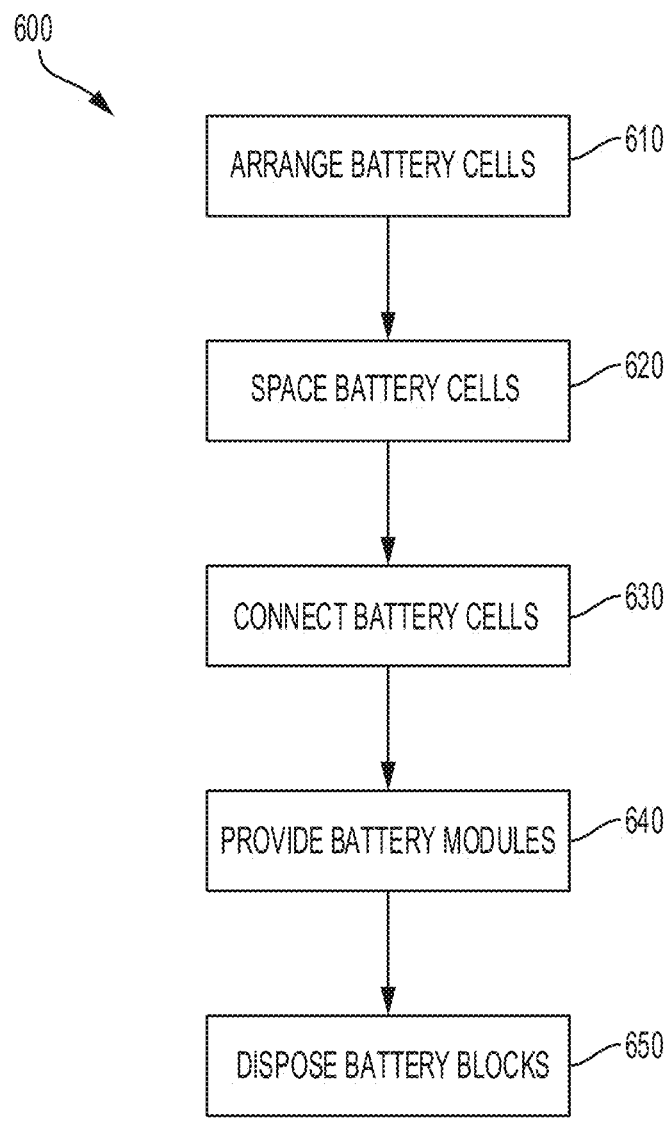
FIG. 6 is a flow diagram depicting an example method for providing an energy storage device.

Referring to FIG. 6, an example embodiment of a method 600 of providing an energy storage device is depicted. The method 600 can include arranging a plurality of battery cells 110 (ACT 610). The battery cells 110 can be disposed within a battery block 105. The number of battery cells 110 within a battery block 105 can vary. For example, a battery block 105 may include one battery cell 110 or fifty battery cells 110. The number of battery cells 110 for a particular battery block 105 can be determined based at least in part on a desired capacity of the battery block 105 or a particular application of the battery block 105. For example, a battery block 105 can contain a fixed "p" amount of battery cells 110, connected electrically in parallel which can increase the capacity by "p" times the single cell capacity. The voltage of the respective battery block 105 (or cell block) can be the same as that of the single battery cell 110 (e.g., 0V to 5V or other ranges), which could be treated as larger cells that can be connected in series into the battery module 100 for battery packs 405.

The method 600 can include spacing the battery cells 110 (ACT 620). Within each battery block 105, the battery cells 110 can be arranged such that they are spatially separated from a neighboring battery cell 110 by a predetermined distance. For example, the plurality of battery cells 110 can be arranged by spatially separating each battery cell 110 of the plurality of battery cells 110 from each of at least one adjacent battery cell 110 by 2 millimeter (mm) or less. The battery cells 110 can be spaced and spatially maintained in place, relative to one another, using a first cell holder 130 and a second cell holder 135, for example as described in connection with at least FIG. 3. Each of the plurality of battery cells 110 can have a voltage of up to 5 volts (e.g., 4.2 volts) across terminals of the corresponding cell.

The method 600 can include forming the first cell holder 130, the second cell holder 135, the first conductive layer 305, the non-conductive layer 310, and the second conductive layer 315 using injection molding techniques. For example, the first cell holder 130 can be formed. The first conductive layer 305 can be coupled with the second conductive layer 315 using the non-conductive layer 310. Each of the first conductive layer 305, the non-conductive layer 310, and the second conductive layer 315 can be coupled with or disposed in the first cell holder 135.

For example, the method 600 can include forming an injection-molded cell holder (e.g., first cell holder 130, second cell holder 135) to spatially maintain the cylindrical battery cells 110 relative to each other. The first cell holder 130 and the second cell holder 135 can be formed having a plurality of apertures 335, 340 respectively that are configured to hold, position or align the battery cells 110 relative to each other and thus may be referred to herein as cell holders. Each of the battery cells 110 can be coupled with or disposed within at least one aperture 335, 340 of the first cell holder 130 and the second cell holder 135. Thus, the arrangement or spacing of the plurality of battery cells 110 relative to each other can be controlled or organized by the apertures 335, 340 of the first cell holder 130 and the second cell holder 135.

The method 600 can include electrically connecting the plurality of battery cells 110 (ACT 630). The plurality of battery cells 110 can be electrically coupled in parallel with one another to provide a battery block 105, a battery module 100, or a battery pack 405. The battery cells 110 can be electrically connected in series, parallel, or both. The battery cells 110 can be electrically connected using electrical connectors such as but not limited to, wires, wirebonds, or bus-bars. For example, a positive terminal 215 of each of the battery cells 110 can be coupled with a wirebond 205 and a negative terminal 220 of each of the battery cells 110 can be coupled with a negative tab 210 to electrically connect the plurality of battery cells 110. The connections can include bonded connections or welded connections. For example, the positive terminal 215 can be bonded with the wirebond 205 and the negative terminal 220 can be welded to the negative tab 210.

The battery cells 110 can be electrically connected using a first conductive layer 305 and a second conductive layer 315 (e.g., operating as busbars) as described herein in connection with at least FIG. 3. The wirebond 205 can couple with the first conductive layer 305 (e.g., positive conductive layer) through a bonded connection. The negative tab 210 can couple with the second conductive layer 315 (e.g., negative conductive layer) through a welded connection. The type of electrical connection, such as series, parallel, or both, can be selected based in part on a particular application for the battery block 105 within which the battery cells 110 are disposed. For example, the battery cells 110 can be electrically connected to provide a battery block 105, a battery module 100 or a battery pack 405 to provide power for a drive unit of an electrical vehicle system 500 (e.g., as depicted in FIG. 5). The battery module 100 or the battery pack 405 can provide power, for example, for a system corresponding to a plug-in hybrid electrical vehicle (PHEV) system, hybrid electrical vehicle (HEV) system, electrical vehicle (EV) system, automotive system, motorcycle system, enterprise or residential energy storage system, 12 volt system, 24 volt system, or 48 volt system, 400 volt system, 800 volt system, 1 kilovolt system.

The method 600 can include providing one or more battery modules 100 (ACT 640). Two or more battery modules 100 can couple, assemble, connect or attach together to form a battery pack 405. For example, the battery modules 100 can be electrically coupled together in parallel or in series within a battery pack 405. The battery modules 100 can be disposed within the battery pack 405 in a variety of different arrangements. For example, the battery modules 100 can be disposed adjacent to each other or next to each other such that one or more side surfaces of a first battery module 100 are in contact with at least one side surface of a second, different battery module 100. The battery modules 100 can be coupled together using electrical connectors, such as but not limited to, wires, wirebonds, or bus-bars. For example, the electrical connectors can couple with at least one surface or terminal (e.g., top surface, side surface, bottom surface) of a first battery module 100 and couple with at least one surface or terminal of a second battery module 100.

The method 600 can include disposing battery blocks 105 in battery modules 100 (ACT 650). Two or more battery blocks 105 can be disposed, installed or incorporated within each of the battery modules 100. The number of battery blocks 105 in a battery module 100 can be selected based at least in part on a desired capacity (e.g., voltage capacity, current capacity) of the battery module 100 or a particular application of the battery module 100. The battery blocks 105 can be positioned adjacent to each other, next to each other, or in contact with each other to form the battery module 100. The battery blocks 105 can be positioned such that a side surface of the first battery block 105 is in contact with a side surface of the second battery block 105. Various types of connectors can couple the battery blocks 105 together within the battery module 100. The connectors may include, but not limited to, straps, wires, adhesive layers, or fasteners.

The battery blocks 105 can be electrically coupled together in series or in parallel within the battery modules 100. For example, one or more wires or wirebonds can couple at least two battery blocks 105 together. The battery blocks 105 can be coupled or configured in series or in parallel to meet varying power and energy requirements. For example, two battery blocks 105 each with 5V across each of their terminals, can be connected electrically in series to form a unit that has a voltage of up to 10V across the terminals of the unit. The number of battery blocks 105 in a battery module 100 can be selected to meet a desired output voltage of the battery module 100.

Figure 7:
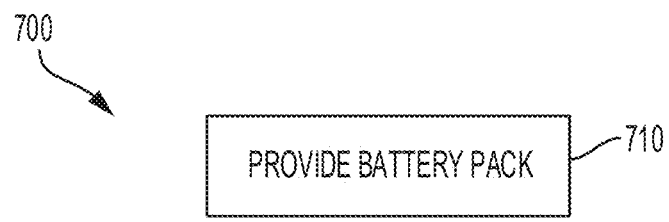
FIG. 7 is a flow diagram depicting an example method for providing a battery pack for an electric vehicle.

Referring to FIG. 7, an example embodiment of a method 700 of providing a battery pack 405 is depicted. The method 700 can include providing a battery pack 405 to power an electric vehicle 505 (ACT 710). The battery pack 405 can reside in the electric vehicle 505. The battery pack 405 can include a plurality of battery modules 100. Each of the plurality of battery modules 100 can include a plurality of battery blocks 105. A first battery block 105 of the plurality of battery blocks 105 can include a pair of battery block terminals 230, 235. The first battery block 105 can include a plurality of cylindrical battery cells 110. Each of the plurality of cylindrical battery cells 110 of the first battery block 105 can include a pair of battery cell terminals 215, 220. Each of the plurality of cylindrical battery cells 110 of the first battery block 105 can include a voltage of up to 5 volts across the pair of battery cell terminals 215, 220. The plurality of cylindrical battery cells 110 can be electrically connected in parallel within the first battery block 105. Each cylindrical battery cell 110 of the plurality of cylindrical battery cells 110 can be spatially separated from each of at least one adjacent cylindrical battery cell 110 within the first battery block 105 by less than 2 millimeter (mm) (e.g., less than 1.2 mm). The plurality of cylindrical battery cells 110 can provide a battery block capacity to store energy that is at least five times greater than a battery cell capacity of each of the plurality of cylindrical battery cells 110. The first battery block 105 can have a voltage of up to 5 volts across the pair of battery block terminals 230, 235 of the first battery block 105. Each of the plurality of battery modules 100 can have a battery module capacity that are greater than the battery block capacity. Each of the plurality of battery modules 100 can have a battery module voltage greater than the voltage across the battery block terminals 230, 235 of the first battery block 105.

While acts or operations may be depicted in the drawings or described in a particular order, such operations are not required to be performed in the particular order shown or described, or in sequential order, and all depicted or described operations are not required to be performed. Actions described herein can be performed in different orders.

Having now described some illustrative implementations, it is apparent that the foregoing is illustrative and not limiting, having been presented by way of example. Features that are described herein in the context of separate implementations can also be implemented in combination in a single embodiment or implementation. Features that are described in the context of a single implementation can also be implemented in multiple implementations separately or in various sub-combinations. References to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any act or element may include implementations where the act or element is based at least in part on any act or element.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein may be embodied in other specific forms without departing from the characteristics thereof. For example the voltage across terminals of battery cells 110 can be greater than 5V. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

Systems and methods described herein may be embodied in other specific forms without departing from the characteristics thereof. For example, descriptions of positive and negative electrical characteristics may be reversed. For example, elements described as negative elements can instead be configured as positive elements and elements described as positive elements can instead by configured as negative elements. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system to power electric vehicles, comprising:
a battery pack to power an electric vehicle, the battery pack residing in the electric vehicle and comprising a plurality of battery modules;
each of the plurality of battery modules comprising a plurality of battery blocks;
a first battery block of the plurality of battery blocks having a pair of battery block terminals, the first battery block comprising a plurality of cylindrical battery cells;
each of the plurality of cylindrical battery cells of the first battery block having a pair of battery cell terminals, each of the plurality of cylindrical battery cells of the first battery block having a voltage of up to 5 volts across each respective pair of battery cell terminals, the plurality of cylindrical battery cells electrically connected in parallel within the first battery block, each cylindrical battery cell of the plurality of cylindrical battery cells spatially separated from each of at least one adjacent cylindrical battery cell within the first battery block by less than 2 millimeter (mm), the plurality of cylindrical battery cells provides a battery block capacity to store energy that is at least five times greater than a battery cell capacity of each of the plurality of cylindrical battery cells, and the first battery block having a voltage of up to 5 volts across the pair of battery block terminals of the first battery block;
each of the plurality of battery modules having a battery module capacity that is greater than the battery block capacity, and each of the plurality of battery modules having a battery module voltage greater than the voltage across the pair of battery block terminals of the first battery block; and
the pair of battery cell terminals of each of the plurality of cylindrical battery cells including a positive terminal and a negative terminal extending from a common end of the respective cylindrical battery cell, the positive terminal connected to a first layer of a cell holder of the first battery block and the negative terminal connected to a second layer of the cell holder of the first battery block.

2. The system of claim 1, comprising:
the cell holder of the first battery block including a non-conductive layer disposed between the first layer of the cell holder and the second layer of the cell holder.

3. The system of claim 1, comprising:
a plurality of enclosures for the plurality of battery blocks, each of the plurality of enclosures to at least partially enclose the plurality of cylindrical battery cells, wherein each of the plurality of enclosures are up to 1 cubic foot in volume.

4. The system of claim 1, comprising:
at least some of the plurality of battery modules and the plurality of battery blocks electrically connected in series.

5. The system of claim 1, comprising:
at least some of the plurality of battery modules and the plurality of battery blocks electrically connected in parallel.

6. The system of claim 1, wherein the battery block capacity corresponds to a total number of cylindrical battery cells in the first battery block.

7. The system of claim 1, comprising:
an injection-molded cell holder to spatially maintain the cylindrical battery cells relative to each other.

8. The system of claim 1, comprising:
an injection-molded cell holder to spatially maintain the cylindrical battery cells relative to each other to at least meet creepage-clearance requirements for the battery pack to provide a voltage of at least 400 volts.

9. The system of claim 1, comprising:
an injection molded cell holder formed from a flame resistant plastic material.

10. The system of claim 1, comprising:
an injection molded cell holder having a material that includes at least one of plastic, polycarbonate, Acrylonitrile Butadiene Styrene (ABS), Polyvinyl chloride (PVC), Polyphenylene sulfide (PPS), and Nylon with glass fill.

11. A method of providing an electric vehicle with a battery pack, comprising:
arranging a plurality of cylindrical battery cells within a battery block, each of the plurality of cylindrical battery cells having a pair of battery cell terminals and the battery block having a pair of battery block terminals;
spatially separating each cylindrical battery cell of the plurality of cylindrical battery cells from each of at least one adjacent cylindrical battery cell by a distance less than 2 millimeters (mm) or less within the battery blocks, each of the plurality of cylindrical battery cells having a voltage of up to 5 volts across each respective pair of battery cell terminals;
electrically connecting the plurality of cylindrical battery cells in parallel with one another to provide a battery block capacity for storing energy that is at least five times greater than a battery cell capacity of each of the plurality of cylindrical battery cells, and having a voltage of up to 5 volts across the pair of battery block terminals of the battery block;

disposing a plurality of the battery blocks within each of a plurality of battery modules, each of the plurality of battery modules having a battery module capacity that is greater than the battery block capacity, and each of the plurality of the battery modules having a battery module voltage that is greater than the voltage across the pair of battery block terminals of the battery block, the pair of battery cell terminals of each of the plurality of cylindrical battery cells including a positive terminal and a negative terminal extending from a common end of the respective cylindrical battery cell;

connecting the positive terminal of the pair of battery cell terminals of each of the plurality of cylindrical battery cells to a first layer of a cell holder of the first battery block;

connecting the negative terminal of the pair of battery cell terminals of each of the plurality of cylindrical battery cells to a second layer of the cell holder of the first battery block; and forming a battery pack using the plurality of the battery modules, to reside in an electric vehicle and to power the electric vehicle.

12. The method of claim 11, comprising:
at least partially enclosing the plurality of cylindrical battery cells in an enclosure of the battery block.

13. The method of claim 12, comprising:
configuring the enclosure to be less than 1 cubic feet in volume.

14. The method of claim 11, comprising:
electrically connecting at least some of the plurality of the battery block in series.

15. The method of claim 11, comprising:
electrically connecting at least some of the plurality of the battery block in parallel.

16. The method of claim 11, comprising:
configuring the battery block to provide a battery block capacity value that corresponds to a total capacity of the plurality of cylindrical battery cells in the battery block.

17. The method of claim 11, comprising:
forming an injection-molded cell holder to spatially maintain the plurality of cylindrical battery cells relative to each other.

18. The method of claim 11, comprising:
forming an injection-molded cell holder to spatially maintain the plurality of cylindrical battery cells relative to each other to at least meet creepage-clearance requirements for the battery pack to provide a voltage of at least 400 volts.

19. The method of claim 11, comprising:
forming an injection molded cell holder using at least one of: a flame resistant plastic material, polycarbonate, Acrylonitrile Butadiene Styrene (ABS), Polyvinyl chloride (PVC), Polyphenylene sulfide (PPS), and Nylon with glass fill.

20. A method of providing a battery pack for an electric vehicle, comprising:
providing a battery pack to power an electric vehicle, the battery pack residing in the electric vehicle, the battery pack comprising:
a plurality of battery modules;
each of the plurality of battery modules comprising a plurality of battery blocks;
a first battery block of the plurality of battery blocks having a pair of battery block terminals, the first battery block comprising a plurality of cylindrical battery cells;
each of the plurality of cylindrical battery cells of the first battery block having a pair of battery cell terminals, each of the plurality of cylindrical battery cells of the first battery block having a voltage of up to 5 volts across each respective pair of battery cell terminals, the plurality of cylindrical battery cells electrically connected in parallel within the first battery block, each cylindrical battery cell of the plurality of cylindrical battery cells spatially separated from each of at least one adjacent cylindrical battery cell within the first battery block by less than 2 millimeter (mm), the plurality of cylindrical battery cells provides a battery block capacity to store energy that is at least five times greater than a battery cell capacity of each of the plurality of cylindrical battery cells, and the first battery block having a voltage of up to 5 volts across the pair of battery block terminals of the first battery block;
each of the plurality of battery modules having a battery module capacity that is greater than the battery block capacity, and each of the plurality of battery modules having a battery module voltage greater than the voltage across the pair of battery block terminals of the first battery block; and
the pair of battery cell terminals of each of the plurality of cylindrical battery cells including a positive terminal and a negative terminal extending from a common end of the respective cylindrical battery cell, the positive terminal connected to a first layer of a cell holder of the first battery block and the negative terminal connected to a second layer of the cell holder of the first battery block.

* * * * *